United States Patent
Chan et al.

(10) Patent No.: US 10,422,814 B2
(45) Date of Patent: Sep. 24, 2019

(54) FALL DETECTION USING MACHINE LEARNING

(71) Applicant: Vital Connect, Inc., Campbell, CA (US)

(72) Inventors: Alexander Chan, Campbell, CA (US); Nima Ferdosi, San Jose, CA (US); Ravi Narasimhan, Sunnyvale, CA (US)

(73) Assignee: Vital Connect, Inc., San Jose, CA (US)

( * ) Notice: Subject to any disclaimer, the term of this patent is extended or adjusted under 35 U.S.C. 154(b) by 205 days.

(21) Appl. No.: 13/945,818

(22) Filed: Jul. 18, 2013

(65) Prior Publication Data

US 2015/0020571 A1 Jan. 22, 2015

(51) Int. Cl.
*G01P 21/00* (2006.01)
*G01P 15/08* (2006.01)

(52) U.S. Cl.
CPC .......... *G01P 21/00* (2013.01); *G01P 15/0891* (2013.01)

(58) Field of Classification Search
CPC ..................................................... G01P 21/00
See application file for complete search history.

(56) References Cited

U.S. PATENT DOCUMENTS

| | | | |
|---|---|---|---|
| 7,356,437 B2 * | 4/2008 | Kobayashi et al. | 702/127 |
| 7,764,641 B2 * | 7/2010 | Pelton et al. | 370/328 |
| 8,115,641 B1 | 2/2012 | Dempsey | |
| 2009/0322540 A1 | 12/2009 | Richardson et al. | |
| 2011/0199216 A1 | 8/2011 | Flinsenberg et al. | |
| 2012/0083237 A1 | 4/2012 | Fish et al. | |
| 2012/0286949 A1 | 11/2012 | Worthington et al. | |
| 2013/0120147 A1 | 5/2013 | Narasimhan et al. | |
| 2013/0197856 A1 * | 8/2013 | Barfield et al. | 702/141 |

OTHER PUBLICATIONS

PCT International Search Report and Written Opinion of the International Searching Authority, dated Oct. 27, 2014, application No. PCT/US2014/047066.
"Convex Function", Retrieved from "https://en.wikipedia.org/w/index.php?title=Convex_function&oldid=815101902", last edited Dec. 12, 2017, 6 pages.
"Convex Optimization", Retrieved from https://en.wikipedia.org/w/index.hptitle=Convex_optimization&oldid=824144041, Last Edited Feb. 5, 2018, 7 pages.

* cited by examiner

*Primary Examiner* — Robert R Raevis
(74) *Attorney, Agent, or Firm* — Brundidge & Stanger, P.C.

(57) ABSTRACT

A method and system for fall detection using machine learning are disclosed. The method comprises detecting at least one signal by a wireless sensor device and calculating a plurality of features from the at least one detected signal. The method includes training a machine learning unit of the wireless sensor device using the features to create a fall classification and a non-fall classification for the fall detection. The system includes a sensor to detect at least one signal, a processor coupled to the sensor, and a memory device coupled to the processor, wherein the memory device includes an application that, when executed by the processor, causes the processor to calculate a plurality of features from the at least one detected signal and to train a machine learning unit of the wireless sensor device using the features to create a fall classification and a non-fall classification for the fall detection.

14 Claims, 4 Drawing Sheets

FALL DETECTION USING MACHINE LEARNING

FIELD OF THE INVENTION

The present invention relates to wireless sensor devices, and more particularly, to wireless sensor devices that detect falls using machine learning.

BACKGROUND

Wireless sensor devices are used in a variety of applications including the health monitoring of users. In many of these health monitoring applications, a wireless sensor device is attached directly to the user's skin to measure certain data. This measured data can then be utilized for a variety of health related applications. In one instance, this measured data can be utilized to assist in detecting when a user has fallen due to a health related disease or external factor and is injured as a result.

Conventional wireless sensor devices utilize approaches to the fall detection of a user that fail to discriminate problematic falls from activities of daily living, such as falling onto a couch to take a nap, and require that the wireless sensor device be attached to the user in specific orientations. Therefore, there is a strong need for a cost-effective and efficient solution that overcomes the aforementioned issues. The present invention addresses such a need.

SUMMARY OF THE INVENTION

A method and system for fall detection using machine learning are disclosed. In a first aspect, the method comprises detecting at least one signal by a wireless sensor device and calculating a plurality of features from the at least one detected signal. The method includes training a machine learning unit of the wireless sensor device using the features to create a fall classification and a non-fall classification for the fall detection.

In a second aspect, the system includes a sensor to detect at least one signal, a processor coupled to the sensor, and a memory device coupled to the processor, wherein the memory device includes an application that, when executed by the processor, causes the processor to calculate a plurality of features from the at least one detected signal and to train a machine learning unit of the wireless sensor device using the features to create a fall classification and a non-fall classification for the fall detection.

BRIEF DESCRIPTION OF THE DRAWINGS

The accompanying figures illustrate several embodiments of the invention and, together with the description, serve to explain the principles of the invention. One of ordinary skill in the art readily recognizes that the embodiments illustrated in the figures are merely exemplary, and are not intended to limit the scope of the present invention.

DETAILED DESCRIPTION

Figure 1:
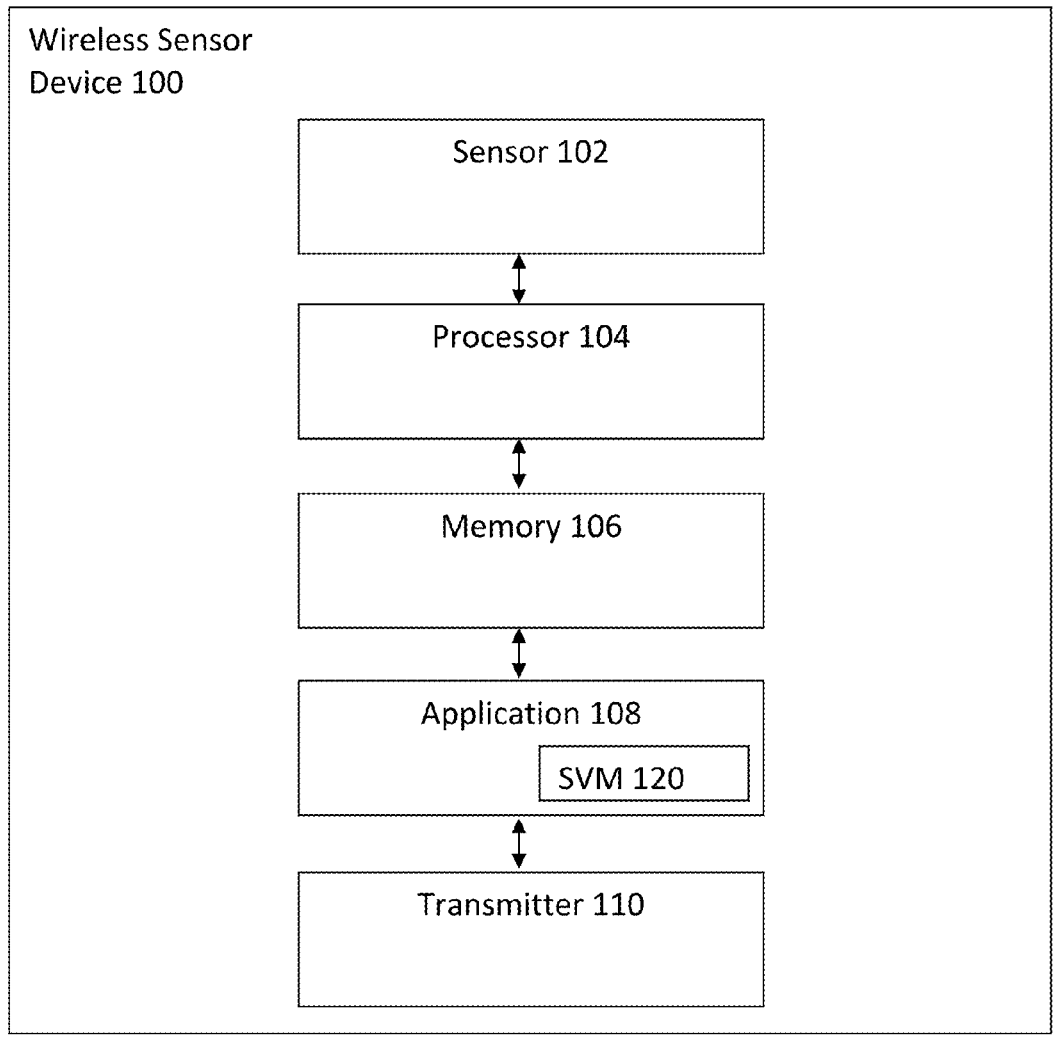
FIG. 1 illustrates a wireless sensor device for fall detection using machine learning in accordance with an embodiment.

The present invention relates to wireless sensor devices, and more particularly, to wireless sensor devices that detect falls using machine learning. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

In one embodiment, a wireless sensor device with an embedded tri-axial accelerometer detects user falls by determining whether a magnitude of acceleration vector is less than a first threshold ($A_l$) or is greater than a second threshold ($A_h$). In another embodiment, the wireless sensor device detects user falls by determining whether, in addition to the satisfaction of the two aforementioned magnitude of acceleration vector thresholds, a Z-axis acceleration component a few seconds after the potential fall is nearly orthogonal to the acceleration vector due to gravity.

These embodiments suffer from limitations that include false positive fall detection events because of the use of simple acceleration thresholds, a smaller margin for threshold optimization to discriminate falls from activities of daily living because of the use of magnitude alone, and inaccuracies when the wireless sensor device is attached to the user in an unknown orientation because the use of a Z-axis component assumes that the wireless sensor device is attached to the user with the Z-axis in the vertical direction.

Attaching a wireless sensor device (e.g. a patch sensor with embedded tri-axial accelerometer) to the user enables the accurate measurement and monitoring of falls and activities of daily living of the user. The accurate fall detection of a user can also prevent additional injuries. Assuming that the orientation of the wireless sensor device is not tightly controlled other than the requirement that the attachment occur on the torso of the user and that the user will be vertical (e.g. walking, standing, or sitting upright) at some point in time before falling, a method and system in accordance with the present invention utilizes machine learning for the fall detection of users.

Calibration schemes are utilized to obtain a calibration vector which is an acceleration vector when the user with attached wireless sensor device is in a vertical position (e.g. walking, standing, sitting upright). In one embodiment, the calibration vector (vertical acceleration vector) is obtained using manual calibration where the user assumes particular postures (e.g. walking, standing, lying, leaning) and notifies the wireless sensor device of that particular posture.

In another embodiment, the wireless sensor device is attached when the user is in a vertical position and an acceleration sample measured immediately thereafter is determined to be the calibration vector. In another embodiment, a pedometer type device is integrated into the wireless sensor device to detect user footsteps. After the wireless sensor device is attached to the user in any horizontal or vertical position, an acceleration sample is measured immediately after the user takes at least one footstep and the measured acceleration sample is determined to be the calibration vector.

Utilizing the calibration vector, the method and system in accordance with the present invention calculates various features from the tri-axial acceleration signals during falls and activities of daily living (ADL). Features are used to train a machine learning algorithm to classify events as falls and non-falls.

In one embodiment, the machine learning algorithm comprises any of supervised learning including but not limited to support vector machines (SVMs), neural networks, decision trees, linear/logistic regression, Bayes, and k-nearest neighbor, unsupervised learning including but not limited to clustering, k-means, principal component analysis (PCA), and singular value decomposition (SVD), and semi-supervised learning. In another embodiment, the wireless sensor device calculates features from the accelerometer that are utilized by the SVM based machine learning algorithm to detect user falls. If a fall is detected, a severity metric is calculated based on the SVM framework.

FIG. 1 illustrates a wireless sensor device 100 for fall detection using machine learning in accordance with an embodiment. The wireless sensor device 100 includes a sensor 102, a processor 104 coupled to the sensor 102, a memory 106 coupled to the processor 104, an application 108 coupled to the memory 106, and a transmitter 110 coupled to the application 108. In one embodiment, the wireless sensor device 100 is attached in any orientation to a user and on any location of the user. In one embodiment, the application 108 includes a support vector machine (SVM) unit 120.

The sensor 102 obtains data from the user and transmits the data to the memory 106 and in turn to the application 108. The processor 104 executes the application 108 to monitor information regarding the user's health. The information is transmitted to the transmitter 110 and in turn relayed to another user or device.

In one embodiment, the sensor 102 is a microelectromechanical system (MEMS) tri-axial accelerometer and the processor 104 is a microprocessor. One of ordinary skill in the art readily recognizes that a variety of devices can be utilized for the sensor 102, the processor 104, the memory 106, the application 108, and the transmitter 110 and that would be within the spirit and scope of the present invention.

One of ordinary skill in the art readily recognizes that a variety of wireless sensor devices can be utilized including but not limited to a wireless sensor device in a patch form-factor, tri-axial accelerometers, uni-axial accelerometers, bi-axial accelerometers, gyroscopes, and pressure sensors and that would be within the spirit and scope of the present invention.

To describe the features of the present invention in more detail, refer now to the following description in conjunction with the accompanying Figures.

In one embodiment, the wireless sensor device 100 utilizes the support vector machine (SVM) 120 to detect user falls. The SVM 120 is a set of related supervised learning units used for classification. The SVM 120 analyzes data detected by the wireless sensor device 100 and recognizes patterns in the data to predict various outcomes for various future inputs/data examples. The SVM 120 produces an SVM model that is a representation of the examples as points in space, mapped so that the examples of separate categories are divided by a clear gap that is as wide as possible. New examples are mapped into the same space and predicted to belong to a category based on which side of the gap they fall on.

Given a set of training examples that are marked into one of two categories, the SVM 120 training algorithm builds a model to predict whether a new example falls into one category or the other. In one embodiment, the SVM 120 is trained using a training data set to determine coefficients ($w_o$ . . . ,$w_6$) of the linear combination of features (r). The training data set contains intentional falls and activities of daily living or non-fall movements (e.g. sitting down on a couch). In another embodiment, in addition to performing linear classification, the SVM 120 performs non-linear classification using a kernel to implicitly map input examples into high-dimensional feature spaces. In another embodiment, the SVM 120 is adapted from online user data uploaded to a centralized database system to carry out semi-supervised or unsupervised learning.

In one embodiment, the wireless sensor device 100 utilizes a plurality of SVMs that are selected based on demographic information. In this embodiment, a first SVM of the plurality of SVMs is trained to detect falls with higher sensitivity and lower false negative rates for older patients/users and a second SVM of the plurality of SVMs is trained to detect falls with higher specificity and lower false positive rates for younger patients/users. The wireless sensor device 100 utilizes either the first SVM or the second SVM based upon the age provided by the user.

Figure 2:
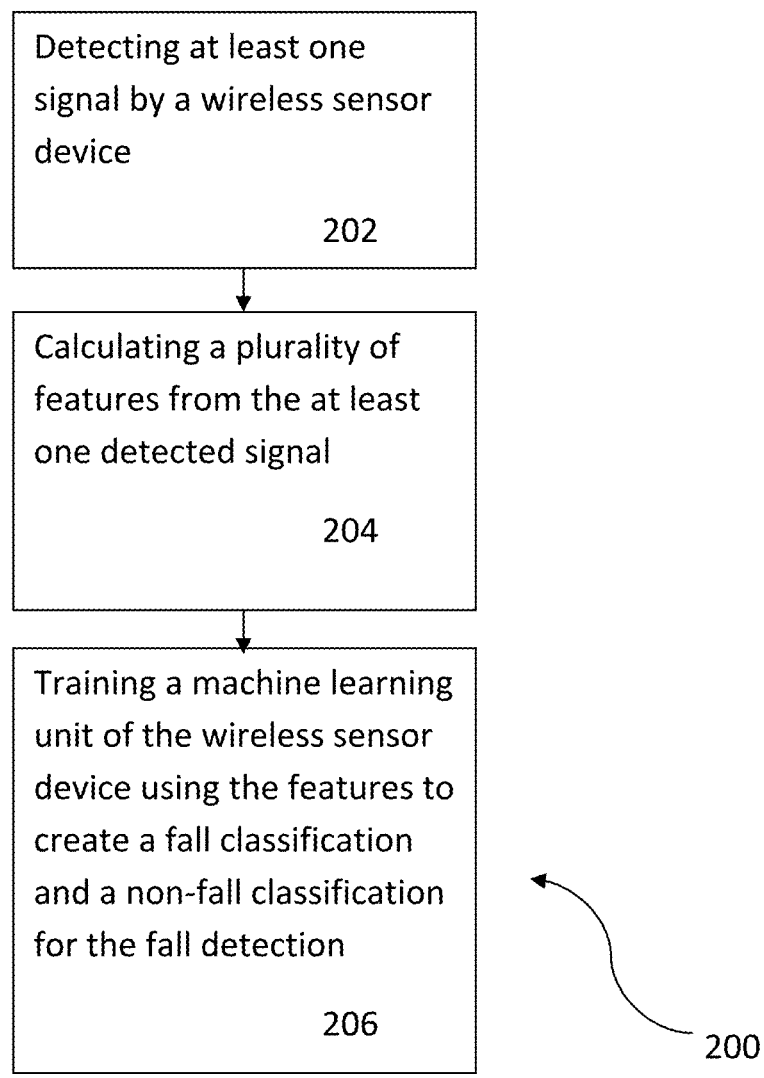
FIG. 2 illustrates a method for fall detection using machine learning in accordance with an embodiment.

FIG. 2 illustrates a method 200 for fall detection using machine learning in accordance with an embodiment. The method 200 includes detecting at least one signal by a wireless sensor device, via step 202, and calculating a plurality of features from the at least one detected signal, via step 204. In one embodiment, the at least one signal comprises a plurality of acceleration samples detected by a tri-axial accelerometer of the wireless sensor device. The method 200 further includes training a machine learning unit of the wireless sensor device using the features to create a fall classification and a non-fall classification for the fall detection.

In one embodiment, the calculating step 204 is carried out during both the times periods of user falls and activities of daily living. In this embodiment, the method 200 includes obtaining a calibration vector from the plurality of acceleration samples using any of manual calibration and implicit calibration. In one embodiment, the machine learning unit is a support vector machine (SVM).

In this embodiment, the method 200 includes initiating the SVM using a training data set that includes intentional falls and activities of daily living to determine coefficients of a linear combination of the features. In this embodiment, the method 200 includes adapting the SVM using online user data submitted by a plurality of wireless sensor devices. In this embodiment, the method 200 includes detecting a fall of a user of the wireless sensor device using the fall and non-fall classifications and calculating a severity metric of the detected fall using the linear combination of the features. In this embodiment, the method 200 includes determining whether the user is upright within a predetermined time period after the detected fall. In this embodiment, the method 200 includes reporting vital signs of the user before and after the detected fall.

Figure 3:
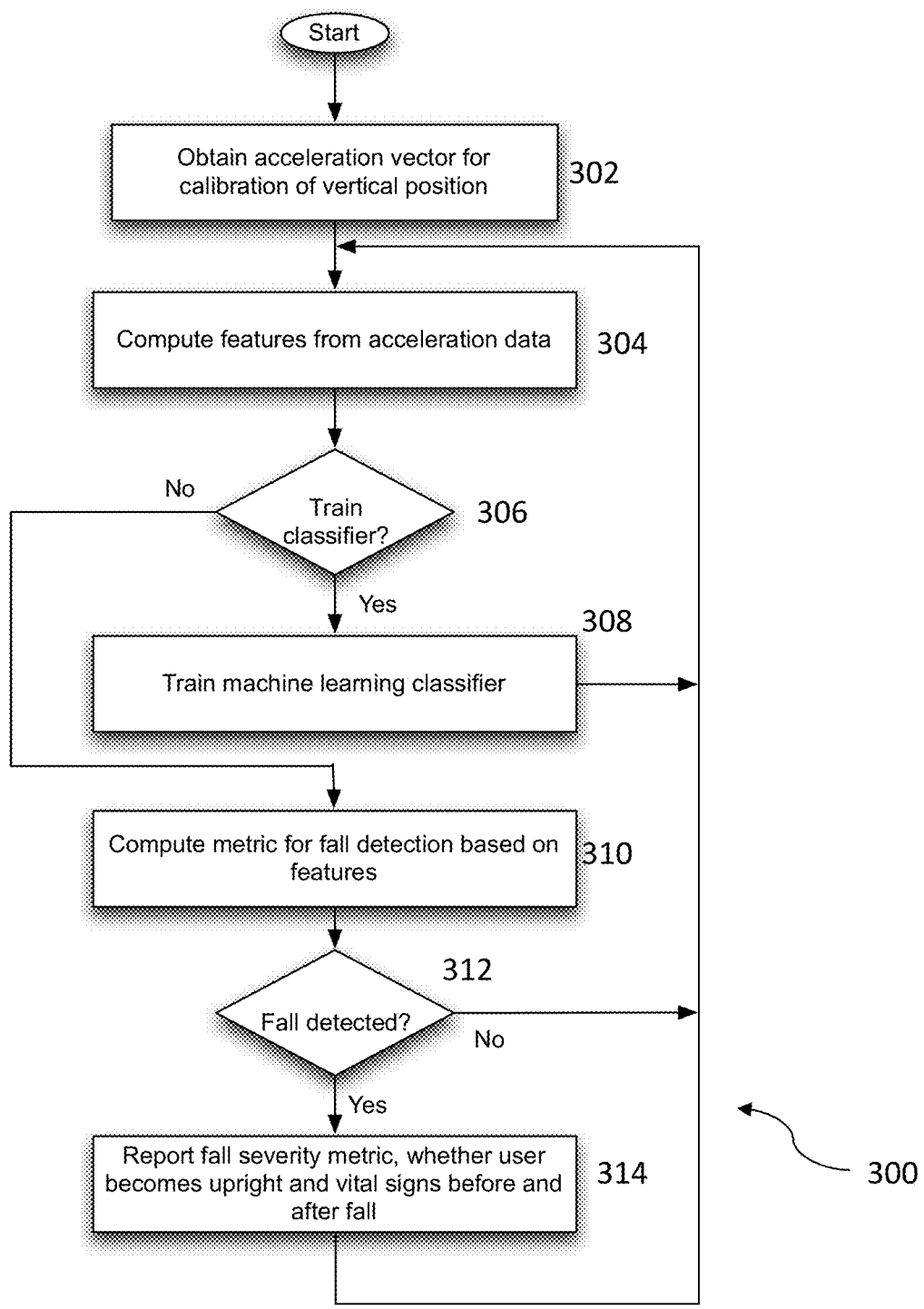
FIG. 3 illustrates another method for fall detection using machine learning in accordance with an embodiment.

FIG. 3 illustrates another method 300 for fall detection using machine learning in accordance with an embodiment. In the method 300, after the wireless sensor device is attached to the user, an acceleration vector is obtained for the calibration of the vertical position, via step 302. The wireless sensor device calculates features from the acceleration data, via step 304, and determines whether a machine learning classifier needs to be trained, via step 306.

If yes (the machine learning classifier needs to be trained), the wireless sensor device trains the machine learning classifier to determine weights (e.g. $w_0$, . . . ,$w_6$), via step 308, and the method 300 returns back to step 304 and the wireless sensor device calculates features from the latest detected acceleration data. If no (the machine learning classifier does not need to be trained), step 308 is skipped, and the wireless sensor device calculates a metric for fall detection based upon the features, via step 310.

The wireless sensor device determines whether a fall is detected, via step 312, and if yes, reports a fall severity metric, determines whether the user becomes upright within a predetermined time period, and determines vital signs of the user before and after the fall, via step 314. If no fall is detected, the method 300 returns back to step 304 and the wireless sensor device calculates features from the latest detected acceleration data.

Figure 4:
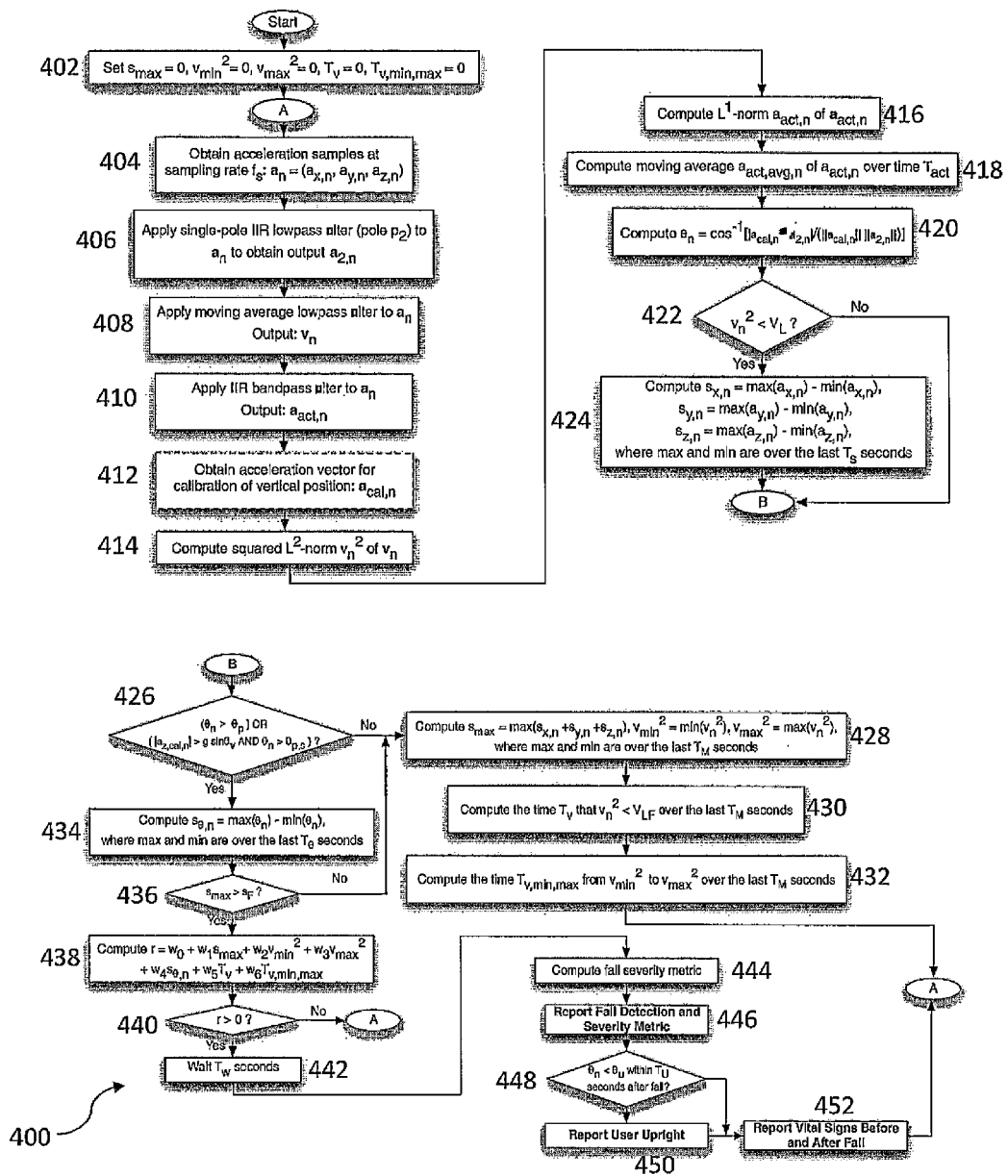
FIG. 4 illustrates a more detailed method for fall detection using machine learning in accordance with an embodiment.

FIG. 4 illustrates a more detailed method 400 for fall detection using machine learning in accordance with an embodiment. The method 400 is utilized by a wireless sensor device that includes a support vector machine (SVM). In the method 400, after the wireless sensor device is attached to the user and detects at least one signal comprised of acceleration samples, a plurality of features are derived from the at least one signal. An L2 norm squared is a vector norm defined for a complex vector.

In one embodiment, the plurality of features include but are not limited to (a) $s_{max}$ which represents the maximum acceleration swing over a time window $T_M$; (b) $v_{min}^2$ which represents the minimum L2 norm squared of a moving-averaged acceleration vector over the time window $T_M$; (c) $v_{max}^2$ which represents the maximum L2 norm squared of the moving-averaged acceleration vector over the time window $T_M$; (d) $s_{\Theta,n}$ which represents the angular swing over a time window $T_\Theta$; (e) $T_v$ which represents the time that the L2 norm squared of the moving-averaged acceleration vector is below a threshold ($V_{LF}$) over the time window $T^M$; and (f) $T_{v,min,max}$ which represents the time elapsed from $v_{min}^2$ to $v_{max}^2$ over the time window $T_M$. The plurality of features provide information on large changes in acceleration, acceleration profiles similar to free fall, large magnitude accelerations caused by impact, and changes in angular orientation of the user.

In FIG. 4, the wireless sensor device initializes by setting $s_{max}$, $V_{min}^2$, $V_{max}^2$, $T_v$, and $T_{v,min,max}$ all to 0, via step 402. The wireless sensor device obtains acceleration samples $a_n$ at a sampling rate of $f_s$ per the equation $a_n = (a_{x,n}, a_{y,n}, a_{z,n})$, via step 404. The wireless sensor device applies a plurality of filters to the acceleration samples $a_n$ including but not limited to a single-pole infinite impulse response (IIR) lowpass filter with pole $p_2$ to output $a_{2,n}$, via step 406, a moving average lowpass filter to output $v_n$, via step 408, and a IIR bandpass filter to output $a_{act,n}$, via step 410.

One of ordinary skill in the art readily recognizes that a variety of filters can be applied to the acceleration samples $a_n$ and that would be within the spirit and scope of the present invention. In one embodiment, the lowpass filter pole $p_2$ for $a_{2,n}$ is equal but not limited to 0.2 Hertz (Hz), the moving average lowpass filter for $v_n$ is equal but not limited to a 1 second moving average, and the bandpass filter for $a_{act,n}$ includes but is not limited to the parameters of A=[1024, −992, 32], B=[496, 0, −496] with a sampling rate $f_s$ of 62.5 Hz.

After applying the filters, the wireless sensor device obtains an acceleration vector for the calibration of a vertical position (the calibration vector) as $a_{cal,n}$, via step 412. In one embodiment, the wireless sensor device only obtains the calibration vector once upon initialization. The L2 norm squared of $v_n$ is calculated as $v_n^2$, via step 414, and the L1 norm of $a_{act,n}$ is calculated as $a_{act,n}$, via step 416. The moving average of $a_{act,n}$ over time $T_{act}$ is calculated as $a_{act,avg,n}$, via step 418. $T_{act}$ is the activity metric averaging time. In one embodiment, $T_{act}$ is equal but not limited to 1 second. The wireless sensor device then calculates $\Theta_n$ (normal angle) per the equation $\cos^{-1}[|a_{cal,n} \cdot a_{2,n}|/(\|a_{cal,n}\| \|a_{2,n}\|)]$, via step 420.

In FIG. 4, the wireless sensor device determines whether $v_n^2$ is less than $v_L$, via step 422. $V_L$ is an acceleration-related threshold on L2 norm squared that is used to calculate intermediate variables necessary for the feature $s_{max}$ (where g=9.81 m/s²). The threshold $V_L$ on the L2 norm squared is used as a power-saving method such that the intermediate variables are calculated only when necessary for fall detection. In one embodiment, $V_L$ is equal but not limited to 0.446 g². If $v_n^2 < v_L$, the wireless sensor device calculates the intermediate variables $s_{x,n}$ as $\max(a_{x,n}) - \min(a_{x,n})$, $s_{y,n}$ as $\max(a_{y,n}) - \min(a_{y,n})$, and $s_{x,n}$ as $\max(a_{z,n}) - \min(a_{z,n})$ where the max and min are determined over the last $T_s$ seconds, via step 424. $T_s$ is the time window for calculating the acceleration swing for each axis x, y, and az. In one embodiment, $T_s$ is equal but not limited to 0.256 seconds.

If $v_n^2$ is not less than $v_L$, step 424 is skipped, and the wireless sensor device determines whether $\Theta_n > \Theta_p$ or whether $|a_{z,cal,n}|$ is greater than g $\sin(\Theta_v)$ and $\Theta_n > \Theta_{p,s}$ via step 426. The first condition ($\Theta_n > \Theta_p$) is used to check whether the user's thoracic angle $\Theta_n$ is greater than $\Theta_p$, e.g. the user's posture has changed from vertical to horizontal with a first threshold $\Theta_p$. The second condition ($|a_{z,cal,n}| > g \sin(\Theta_v)$ AND $\Theta_n > \Theta_{p,s}$) is used to check whether the user's posture is horizontal according to a second (typically lower) threshold $\Theta_{p,s}$ if the user's vertical position is stooped, which is determined by the inequality $|a_{z,cal,n}| > g \sin(\Theta_v)$. In FIG. 4, $\Theta_n$ is a thoracic angle with respect to the vertical position, $\Theta_p$ is a horizontal position criterion where 90 degrees means perpendicular to the vertical calibration vector, $\Theta_v$ is a stooped threshold where 0 degrees means completely vertical, and $\Theta_{p,s}$ is a horizontal position criterion when stooped where 90 degrees means perpendicular to the vertical calibration vector.

In one embodiment, $\Theta_p$ is equal but not limited to 45 degrees, $\Theta_v$ is equal but not limited to 30 degrees, and $\Theta_{p,s}$ is equal but not limited to 40 degrees. If either comparison is not met per step 426, the wireless sensor device calculates the following equations $s_{max} = \max(s_{x,n} + s_{y,n} + s_{z,n})$, $v_{min}^2 = \min(v_n^2)$, and $v_{max}^2 = \max(v_n^2)$, where the max and min are determined over the last $T_M$ seconds, via step 428. $T_M$ is the time window for determining several features for the support vector machine (SVM). In one embodiment, $T_M$ is equal but not limited to 2 seconds.

The wireless sensor device then calculates a time period ($T_v$) where $v_n^2 < v_{LF}$ over the last $T_M$ seconds, via step 430. $V_{LF}$ is an acceleration-related threshold below which L2 norm squared lies to determine the feature $T_v$. In one embodiment, $V_{LF}$ is equal but not limited to 0.2768 g². After calculating $T_v$, $T_{v,min,max}$ from $v_{min}^2$ to $v_{max}^2$ is calculated over the last $T_M$ seconds, via step 432, and the method 400 returns back to step 404 to obtain additional acceleration samples from the user of the wireless sensor device.

If either $\Theta_n > \Theta_p$ or $|a_{z,cal,n}| > g \sin_v$ and $\Theta_n > \Theta_{p,s}$ per step 426, the wireless sensor device calculates $s_{\Theta,n} = \max(\Theta_n) - \min(\Theta_n)$ where the max and min are determined over the last $T_\Theta$ seconds, via step 434. $T_\Theta$ is the time window for calculating $s_{\Theta,n}$. In one embodiment, $T_\Theta$ is equal but not limited to 1.5 seconds.

The wireless sensor device determines whether $s_{max}$ is greater than $s_F$, via step 436, and if not ($s_{max}$ is not greater than $s_F$), the method 400 returns to step 428. In FIG. 4, $s_F$ is an acceleration-related threshold above which the maximum acceleration swing $s_{max}$ must be in order to calculate the linear combination of features (r) for the fall detection. In one embodiment, $s_F$ is equal but not limited to 1.95 g.

If yes ($s_{max}>s_F$), r is calculated using linear combination per the equation $r=w_0+w_1 s_{max}+w_2 v_{min}^2+w_3 v_{max}^2+w_4 s_{\Theta,n}+w_5 T_v+w_6 T_{v,min,max}$, via step 438, and determines whether r>0, via step 440. The coefficients $w_0$ to $w_6$ are determined by the wireless sensor device during the SVM training and using initial training data. The SVM algorithm takes the labeled training data (e.g., feature vectors with fall/non-fall labels) and performs a convex optimization to determine the coefficients $w_0$ to $w_6$. If r<=0, the method 400 returns back to step 404 to obtain additional acceleration samples from the user of the wireless sensor device.

If r>0, the wireless sensor device waits $T_w$ seconds, via step 442, before calculating a fall severity metric, via step 444. $T_w$ is the waiting time after the SVM criterion of r>0 has been satisfied for the fall detection. In one embodiment, $T_w$ is equal but not limited to 20 seconds. The wireless sensor device reports a fall detection (that the user of the wireless sensor device has fallen) and reports the severity metric, via step 446. It is determined whether $\Theta_n<\Theta_u$ within $T_U$ seconds after the fall, via step 448. $T_U$ is the time window to detect if the user gets into an upright position again after the fall and $\Theta_u$ is the threshold for upright detection after the fall where 0 degrees means parallel to the vertical calibration vector and 90 degrees means perpendicular to the vertical calibration vector. In one embodiment, $T_U$ is equal but not limited to 30 seconds and $\Theta_u$ is equal but not limited to 45 degrees.

If $\Theta_n<\Theta_u$ within $T_U$ seconds after the fall, the wireless sensor device reports that the user is upright, via step 450, and then reports the vital signs of the user before and after the detected fall, via step 452. If $\Theta_n$ is not less than $\Theta_u$ within $T_U$ seconds after the fall, a more severe fall may have been experienced by the user and the wireless sensor device immediately reports the vital signs of the user before and after the fall, via step 452, and transmits an alert and/or message to an authorized user or system. After reporting the vital signals, the method 400 returns back to step 404 to obtain additional acceleration samples from the user of the wireless sensor device.

In another embodiment, the wireless sensor device reports a variety of fall detection quantities including but not limited to any of a fall detection notification near real-time, a severity metric for the fall detection, a notification that the user is upright with a predetermined time period near real-time (e.g. $T_U$), and vital signs (e.g. heart rate, respiratory rate, etc.) before and after the fall.

In addition to detecting falls, the wireless sensor device determines and reports a measure of the severity of the detected falls. In one embodiment, the severity metric is determined using the calculated linear combination (r) of the features. If r is a large positive value, the data is far away from the fall and non-fall classifications of the SVM decision boundary, thereby denoting a severe fall with a large severity metric.

If r is a smaller positive value (e.g. r is closer to 0), the data is closer to the fall and non-fall classifications of the SVM decision boundary, thereby denoting a less severe/mild fall with a smaller severity metric. In another embodiment, the severity metric is determined on a scale of 1-10 per the equation fall_severity=ceil[(2/(1+exp(−1.1*r))−1)*10], where ceil[x] is the ceiling function that provides the smallest integer that is greater than or equal to x.

As above described, the system provides a wireless sensor device with an embedded machine learning unit including but not limited to a support vector machine (SVM) that determines whether a user has fallen and the severity of that fall. The wireless sensor device determines various features from detected acceleration signals during falls and activities of daily living and then uses the features to train the SVM to classify the data into fall and non-fall classifications. As additional data is detected by the wireless sensor device and inputted through the SVM, whether the user has fallen is automatically and continuously monitored by the wireless sensor device.

A method and system for fall detection by a wireless sensor device using machine learning have been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or calculator-readable medium. The software application provides instructions that enable the processor to perform the functions described herein.

Furthermore, embodiments may take the form of a calculator program product accessible from a calculator-usable or calculator-readable medium providing program code for use by or in connection with a calculator or any instruction execution system. For the purposes of this description, a calculator-usable or calculator-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a calculator-readable medium include a semiconductor or solid state memory, magnetic tape, a removable calculator diskette, a random access memory (RAM), a read-only memory (ROM), a rigid magnetic disk, and an optical disk. Current examples of optical disks include DVD, compact disk-read-only memory (CD-ROM), and compact disk—read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for fall detection using machine learning, the method comprising:

detecting a first signal by a wireless sensor device, wherein the first signal includes a first acceleration sample detected by a tri-axial accelerometer of the wireless sensor device during a first time period of a user fall process;

detecting a second signal by a wireless sensor device, wherein the second signal includes a second acceleration sample detected by a tri-axial accelerometer of the wireless sensor device during a second time period of a user non-falling process;

obtaining a calibration vector from the first and second acceleration samples by receiving notification of posture information at the wireless sensor device;

calculating a first feature of the first time period using the detected first signal and the calibration vector;

calculating a second feature of the second time period using the detected second signal and the calibration vector;

initiating a support vector machine within an application of the wireless sensor device using a training data set that includes data of an intentional fall process and data of an intentional user non-falling process to determine a plurality of coefficients;

calculating a linear combination of features using the determined plurality of coefficients and the calculated first feature and the calculated second feature; and detecting a fall of a user of the wireless sensor device using the linear combination of features.

2. The method of claim 1, wherein the calculating is carried out during both periods of falls and activities of daily living.

3. The method of claim 1, further comprising:
adapting the SVM using online user data submitted by a plurality of wireless sensor devices.

4. The method of claim 1, further comprising:
calculating a severity metric of the detected fall using the linear combination of the features.

5. The method of claim 4, further comprising:
determining whether the user is upright within a predetermined time period after the detected fall.

6. The method of claim 4, further comprising:
reporting vital signs of the user before and after the detected fall.

7. The method of claim 1, wherein the calibration vector is obtained once upon initialization.

8. A system for fall detection using machine learning, the system comprising:
a sensor to:
detect a first signal, wherein the first signal includes a first acceleration sample detected by a tri-axial accelerometer during a first time period of a user fall process;
detect a second signal, wherein the second signal includes a second acceleration sample detected by a tri-axial accelerometer during a second time period of a user non-falling process;
a processor coupled to the sensor;
a memory device coupled to the processor; and
an application coupled to the memory device, wherein the application, when executed by the processor, causes the processor to:
obtain a calibration vector from the first and second acceleration samples by receiving notification of posture information at the wireless sensor device;
calculate a first feature of the first time period using the detected first signal and the calibration vector;
calculate a second feature of the second time period using the detected second signal and the calibration vector;
initiate a support vector machine within the application using a training data set that includes data of an intentional fall process and data of an intentional user non-falling process to determine a plurality of coefficients;
calculate a linear combination of features using the determined plurality of coefficients and the calculated first feature and the calculated second feature; and
detect a fall of a user of the wireless sensor device using the linear combination of features.

9. The system of claim 8, wherein the calculating is carried out during both periods of falls and activities of daily living.

10. The system of claim 8, wherein the support vector machine (SVM) is a machine learning unit.

11. The system of claim 10, wherein the application, when executed by the processor, further causes the processor to:
adapt the SVM using online user data submitted by a plurality of wireless sensor devices.

12. The system of claim 8, wherein the application, when executed by the processor, further causes the processor to:
calculate a severity metric of the detected fall using the linear combination of the features.

13. The system of claim 12, wherein the application, when executed by the processor, further causes the processor to:
determine whether the user is upright within a predetermined time period after the detected fall.

14. The system of claim 12, wherein the application, when executed by the processor, further causes the processor to:
report vital signs of the user before and after the detected fall.

* * * * *